United States Patent [19]
Cheng

[11] Patent Number: 5,768,101
[45] Date of Patent: Jun. 16, 1998

[54] PORTABLE COMPUTER DOCKING BASE WITH DUCTED INTERIOR COOLING AIR PASSSAGE

[75] Inventor: Chun-Che Cheng, Keelung City, Taiwan

[73] Assignee: Compaq Computer Corporation, Houston, Tex.

[21] Appl. No.: 772,184

[22] Filed: Dec. 20, 1996

[51] Int. Cl.⁶ .............................. G06F 1/20; G06F 1/16; H05K 7/20
[52] U.S. Cl. .................. 361/687; 361/686; 454/184
[58] Field of Search ................ 454/184; 165/104.34; 364/708.1; 361/686, 687, 690, 694, 695

[56] References Cited

U.S. PATENT DOCUMENTS

| | | | |
|---|---|---|---|
| 4,949,934 | 8/1990 | Krenz et al. | 248/676 |
| 5,119,270 | 6/1992 | Bolton et al. | 361/694 X |
| 5,224,020 | 6/1993 | Golledge et al. | 361/687 |
| 5,456,632 | 10/1995 | Ohtsu et al. | 361/695 X |
| 5,694,292 | 12/1997 | Paulsel et al. | 361/686 |

FOREIGN PATENT DOCUMENTS 4-48693  2/1992  Japan ..................... 361/687

*Primary Examiner*—Michael W. Phillips
*Attorney, Agent, or Firm*—Konneker & Smith, P.C.

[57] ABSTRACT

A docking base for a portable computer includes a hollow housing with a generally horizontal support portion for supporting the portable computer thereon and a generally upright portion disposed on a rear end of the support portion. The docking base further includes a connector unit provided on the upright portion of the housing. The connector unit is adapted to engage corresponding connector units on a rear side of the portable computer for connecting the portable computer to at least one computer peripheral device. The upright portion of the housing includes a front wall that is formed with a vent hole to be juxtaposed with a heat-dissipating fan unit on the rear side of the portable computer so that hot air from the fan unit can enter into the housing. The upright portion is further formed with an exhaust hole to prevent the hot air from being trapped in the housing. A conduit unit is mounted in the upright portion of the housing, and has an inlet end adjacent the vent hole and an outlet end adjacent the exhaust hole. The conduit unit guides the hot air that enters the vent hole out of the housing via the exhaust hole.

12 Claims, 4 Drawing Sheets

PORTABLE COMPUTER DOCKING BASE WITH DUCTED INTERIOR COOLING AIR PASSSAGE

BACKGROUND OF THE INVENTION

1. Field of the Invention

This invention generally relates to a docking base, and more particularly relates to a docking base that is suitable for use with a portable computer, such as a notebook personal computer, having a heat-dissipating fan unit on a rear side thereof.

2. Description of Related Art

Docking bases are used as extension devices which facilitate connection of a portable computer, such as a notebook personal computer, to different computer peripheral devices, e.g. printers, scanners, etc. As such, since the various computer peripheral devices that are installed are connected to the docking base, there is no need to disconnect the portable computer from the computer peripheral devices. Instead, the portable computer is simply detached from the docking base when it is desired to move the computer to another location.

FIG. 1 (Prior Art) illustrates a conventional docking base 2 for use with a portable computer 1. As shown, the docking base 2 includes a hollow housing 20 with a generally horizontal support portion 21 for supporting the portable computer 1 thereon. The housing 20 further has a generally upright portion 22 disposed on a rear end of the support portion 21 and provided with a connector unit 23. The connector unit 23 is adapted to engage corresponding connector units (not shown) on the rear side of the portable computer 1, and permits connection of the portable computer 1 to different computer peripheral devices (not shown).

As shown in FIG. 1 (Prior Art), the portable computer 1 is provided with a battery unit 10, and a heat-dissipating fan unit 11 on a left side of the portable computer 1. Due to size constraints, the arrangement as such results in a smaller number of data storage units, e.g. floppy disk or CD-ROM drive 12, hard disk drive 13 and PCMCIA card drive 14, that can be installed in the computer.

In order to permit installation of a greater number of data storage units, it has been proposed to modify the portable computer (see FIG. 2) so that the heat-dissipating fan unit 31 is disposed on the rear side of the portable computer 3. Thus, unlike the portable computer 1 shown in FIG. 1 (Prior Art) which permits installation of only one floppy disk or CD-ROM drive 12, the portable computer 3 is installed with a battery unit 30, a floppy disk drive 32, a hard disk drive 33, a PCMCIA card drive 34 and a CD-ROM drive 35.

Note that the conventional docking base 2 of FIG. 1 (Prior Art) is not suitable for use with the portable computer 3 since the upright portion 22 of the housing 20 of the docking base 2 will block the fan unit 31.

SUMMARY OF THE INVENTION

In carrying out principles of the present invention, in accordance with a preferred embodiment thereof, a docking base is provided which is adapted for use with a portable computer, such as a notebook personal computer, having a heat-dissipating fan unit on a rear side thereof. To accommodate the rear fan placement in the computer, an air flow passage is extended through a housing portion of the docking base against which the rear side of the computer is placed when the computer is operatively coupled to the docking base. The passage is positioned and configured to receive and then flow to the exterior of the housing portion the cooling air discharged from the computer fan unit. This, in turn, permits additional data storage apparatus to be installed in the portable computer due to its space-saving rear mounting of the cooling fan unit.

In a preferred embodiment thereof, the docking base representatively includes a hollow housing with a generally horizontal support portion for supporting a portable computer thereon, and a generally upright portion disposed on a rear end of the support portion. The docking base further includes a connector unit provided on the upright portion of the housing. The connector unit is adapted to engage corresponding connector units on a rear side of the portable computer for connecting the portable computer to at least one computer peripheral device.

The upright portion of the housing includes a front wall that is formed with a vent hole to be juxtaposed with a heat-dissipating fan unit on the rear side of the portable computer so that hot air from the fan unit can enter into the housing. The upright portion is further formed with an exhaust hole to prevent the hot air from being trapped in the housing. A conduit unit is mounted in the upright portion of the housing, and has an inlet end adjacent the vent hole and an outlet end adjacent the exhaust hole. The conduit unit guides the hot air that enters the vent hole out of the housing via the exhaust hole.

DETAILED DESCRIPTION

Figure 1:
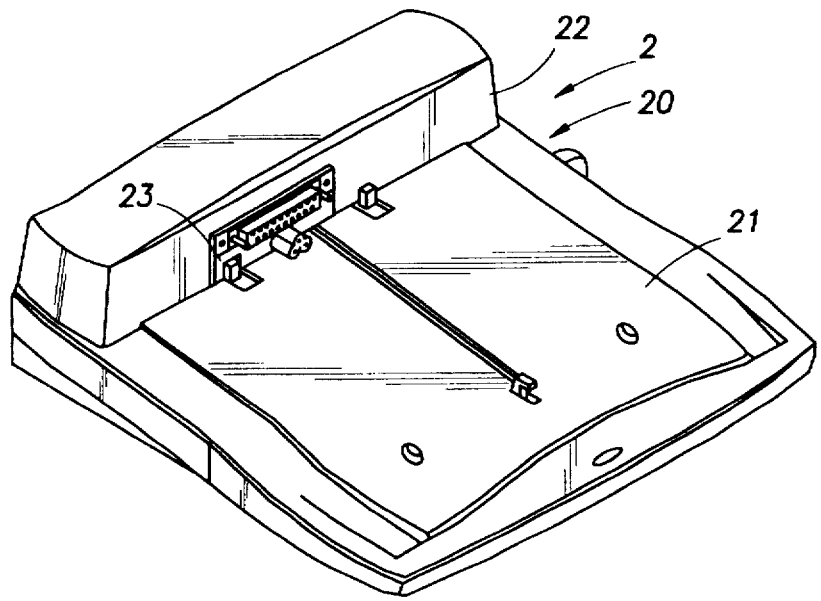
FIG. 1 (Prior Art) illustrates a conventional docking base and a conventional portable computer having a heat-dissipating fan unit on a left side thereof.
Figure 1:
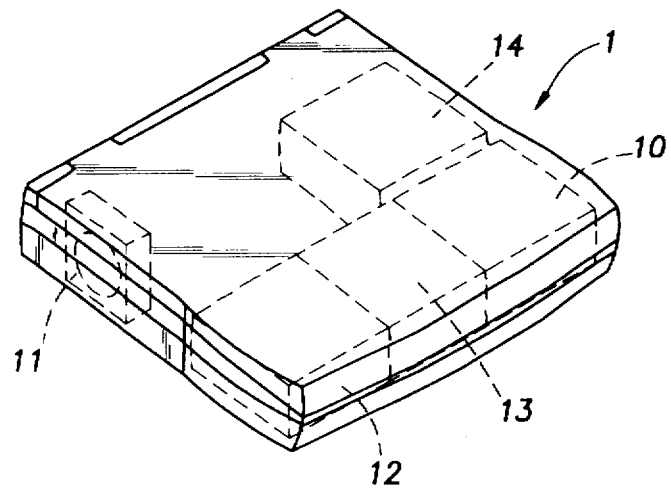
Figure 2:
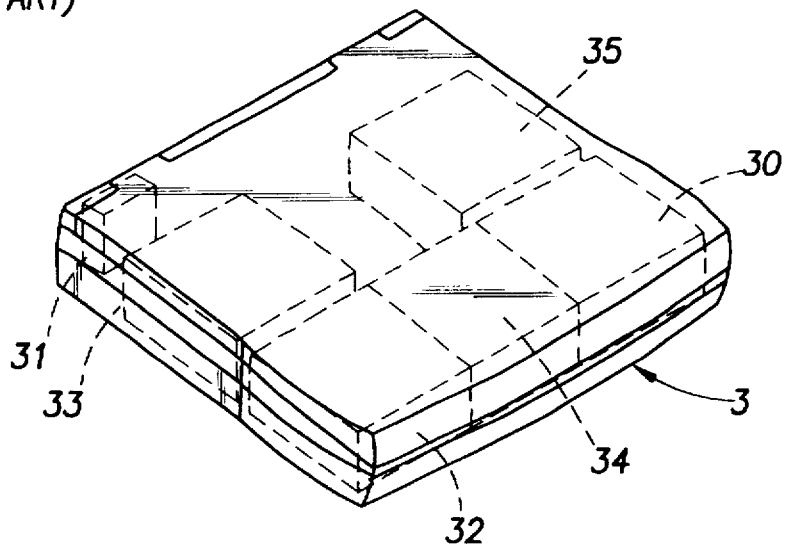
FIG. 2 (Prior Art) is a schematic view of a known portable computer having a heat-dissipating fan unit on a rear side thereof.
Figure 3:
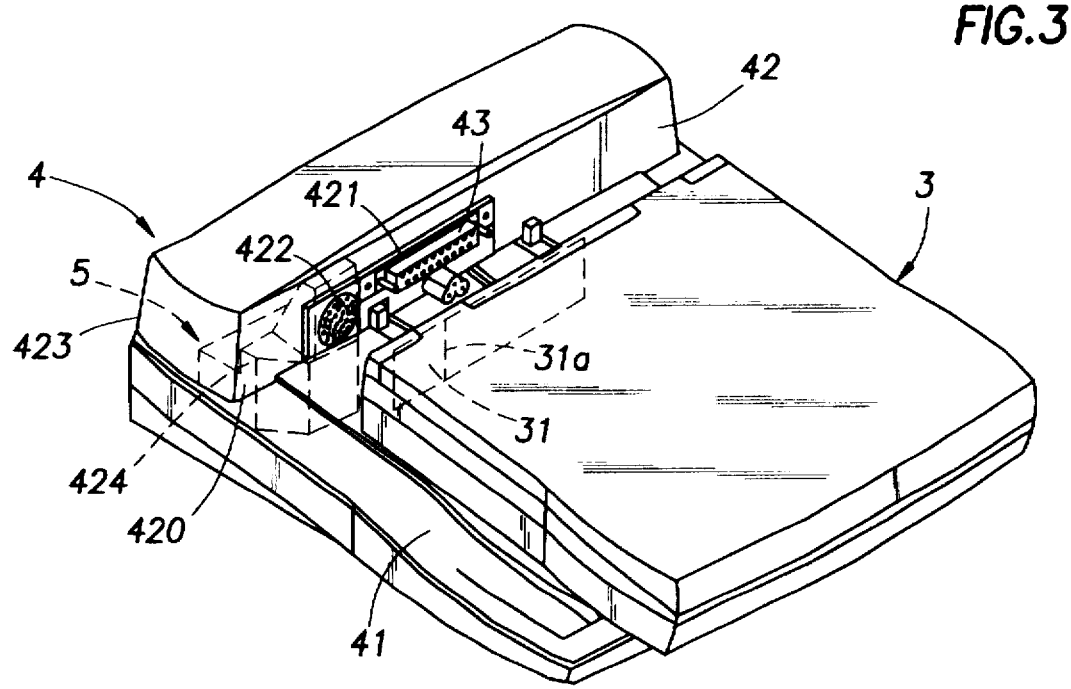
FIG. 3 is a perspective view of a specially designed docking base which embodies principles of the present invention and is useable with the portable computer of FIG. 2.

FIG. 3 illustrates a specially designed docking base 4 which embodies principles of the present invention and is useable with the portable computer 3 of FIG. 2. As shown, the docking base 4 includes a hollow housing with a generally horizontal support portion 41 for supporting the portable computer 3 thereon, and a generally upright portion 42 disposed on a rear end of the support portion 41. A connector unit 43 is provided on the upright portion 42 of the housing and is adapted to engage corresponding connector units on the rear side of the portable computer 3, thereby permitting connection of the portable computer 3 to different computer peripheral devices (not shown). The upright portion 42 includes a front wall 420 that is formed with an opening 421 to permit extension of the connector unit 43 therethrough. Unlike the conventional docking base 2 of FIG. 1 (Prior Art), the opening 421 is wider than the connector unit 43, thereby defining a vent hole 422 to be juxtaposed with the rearwardly mounted fan unit 31 of the portable computer 3. As such, hot air discharged from the fan unit 31 through a corresponding rear housing side wall opening 31a in the computer 3 can enter into the docking base housing via the vent hole 422. The upright portion 42 is further formed with an exhaust hole 424 to prevent the hot air from the fan unit 31 from being trapped in the housing. In this embodiment, the exhaust hole 424 is representatively formed in a lower end section of a rear wall 423 of the upright portion 42.

Figure 4:
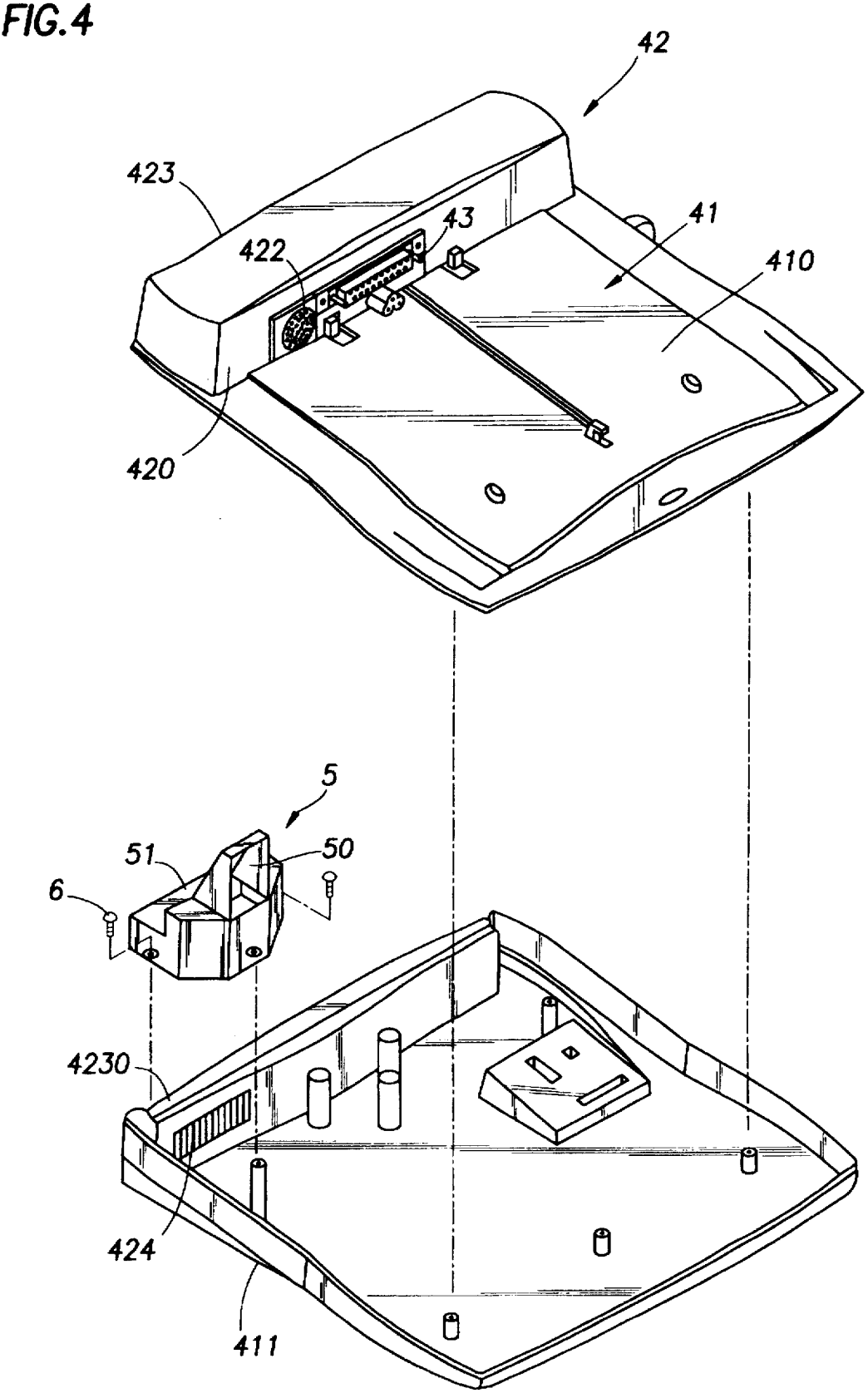
FIG. 4 is an exploded view of the FIG. 3 docking base.
Figure 5:
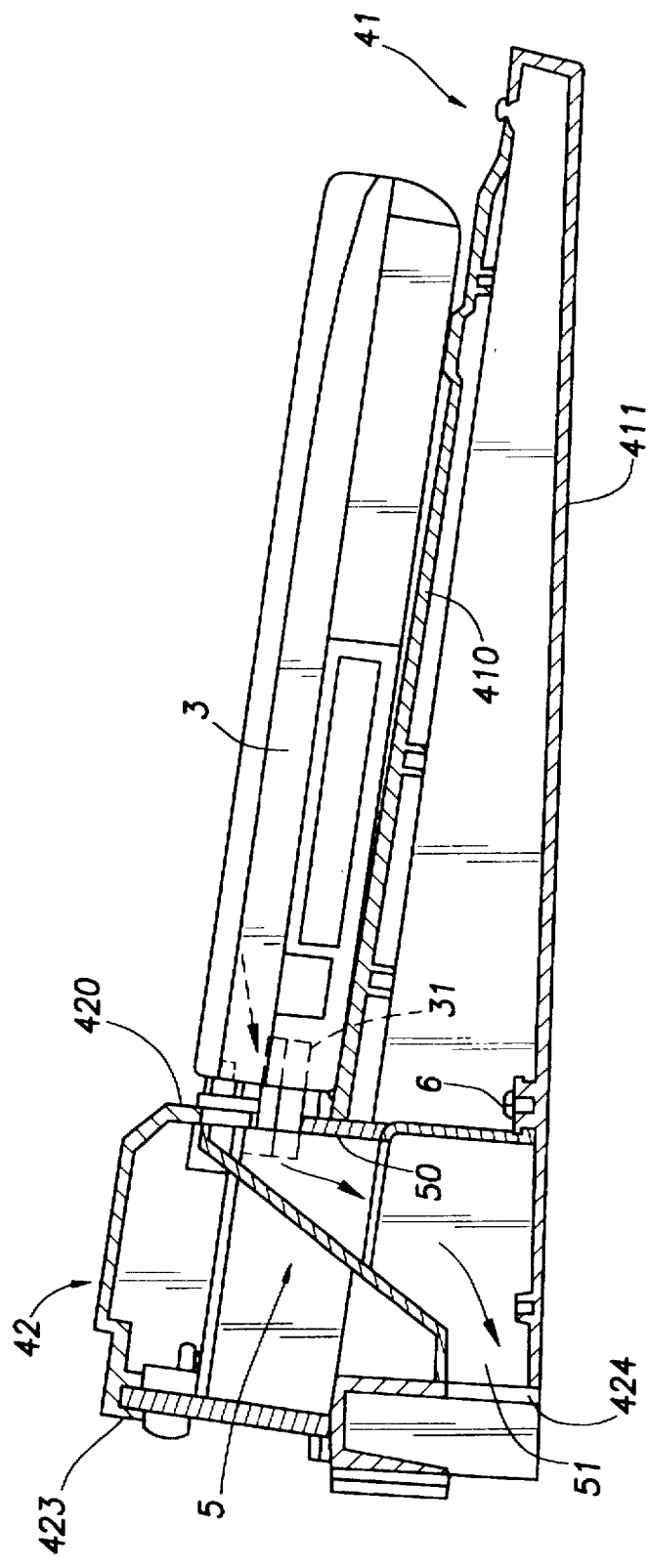
FIG. 5 is a cross-sectional view through the docking base and portable computer of FIG. 3 during docked operation of the portable computer.

As shown in FIG. 4, the housing of this embodiment is representatively formed from complementary upper and lower housing halves. The front wall 420 of the upright portion 42 extends upwardly and integrally from a rear end of a generally horizontally extending upper support plate 410 of the support portion 41. The lower end section 4230 of the rear wall 423 of the upright portion 42 is formed integrally with a rear end of a generally horizontally extending lower base plate 411 of the support portion 41. The docking base 4 further includes a conduit unit 5 that is mounted in the upright portion 42 (see FIG. 5) between the upper and lower housing halves by means of screws 6. The conduit unit 5 has an inlet end 50 adjacent the vent hole 422 and an outlet end 51 adjacent the exhaust hole 424. The conduit unit 5 is configured so that hot air that enters into the housing via the vent hole 422 can be guided out of the housing via the exhaust hole 424, as shown in FIG. 5.

The foregoing detailed description is to be clearly understood as being given by way of illustration and example only, the spirit and scope of the present invention being limited solely by the appended claims.

What is claimed is:

1. Computer apparatus comprising:
    a portable computer having a housing wall portion through which cooling air may be outwardly discharged; and
    a docking base to which said portable computer may be docked to operatively couple it to a peripheral device, said docking base including:
    a hollow housing section with an interior, a first exterior wall section positioned to be in a contiguous, facing relationship with said housing wall portion of said portable computer when said portable computer is docked, and a second exterior wall section spaced apart from said first exterior wall section,
    a cooling air inlet opening formed in said first exterior wall section for receiving cooling air discharged from said portable computer,
    a cooling air outlet opening formed in said second exterior wall section, and
    a conduit structure extending through said interior and having inlet and outlet ends respectively secured to said first and second exterior wall sections at said cooling air inlet and outlet openings,
    said conduit structure having a volume less than that of said interior and forming therein a flow path which is isolated from said interior and through which computer cooling discharge air entering said cooling air inlet opening may be flowed to and outwardly discharged through said cooling air outlet opening.

2. The computer apparatus of claim 1 wherein:
    said portable computer housing wall portion is a rear housing wall portion with a cooling air outlet opening disposed therein, and
    said first exterior wall section is a vertical front wall section of said hollow housing section of said docking base, said cooling air inlet opening being positioned to be aligned with the cooling air outlet opening of the docked portable computer.

3. The computer apparatus of claim 2 wherein:
    said first exterior wall section has a first electrical connector structure disposed therein, and
    said rear housing wall portion of said portable computer has a second electrical connector structure disposed thereon and releasably mateable with said first electrical connector structure.

4. The computer apparatus of claim 3 wherein:
    said first exterior wall section has a connector opening formed therein,
    said first electrical connector structure extends through said connector opening, and
    a portion of said connector opening defines said cooling air inlet opening.

5. The computer apparatus of claim 2 wherein:
    said second exterior wall section is a vertical rear wall section of said hollow housing section of said docking base.

6. The computer apparatus of claim 5 wherein:
    said cooling air outlet opening in said rear wall section of said hollos housing section of said docking base is downwardly offset from said cooling air inlet opening in said front wall section of said hollow housing section of said docking base.

7. The computer apparatus of claim 1 wherein said portable computer is a notebook computer.

8. A portable computer docking base comprising:
    a hollow outer housing portion having first and second spaced apart exterior wall sections and an interior;
    a cooling air inlet opening formed in said first exterior wall section for receiving cooling air discharged from a portable computer supported on said docking base;
    a cooling air outlet opening formed in said second exterior wall section; and
    a conduit structure extending through said interior and having inlet and outlet ends respectively connected to said first and second exterior wall sections at said cooling air inlet and outlet openings,
    said conduit structure having a volume less than that of said interior and forming therein a flow path which is isolated from said interior and through which computer cooling discharge air entering said cooling air inlet opening may be flowed to said cooling air outlet opening for outward discharge therethrough.

9. The portable computer docking base of claim 8 wherein:
    said first exterior wall section has a connector opening formed therein,
    said computer socking base has an electrical connector extending therethrough and being mateable with a computer connector, and
    a portion of said connector opening defines said cooling air inlet opening.

10. A docking base for a portable computer having a heat-dissipating fan unit disposed on a rear side thereof and operative to rearwardly discharge cooling air from the interior of the computer, said docking base comprising:
    a hollow housing including a horizontal front support portion atop which the portable computer bay be supported, a rear portion disposed on a rear end of said support portion and having an upwardly projecting front exterior wall section and a second exterior wall section spaced apart from said front exterior wall section, and a first electrical connector carried on said front exterior wall and mateable with a corresponding second electrical connector on the portable computer;

an inlet opening formed in said front exterior wall section for receiving discharged cooling air from the portable computer;

an outlet opening formed in said second exterior wall section; and a conduit structure extending through the interior of said rear portion of said hollow housing and having inlet and outlet ends respectively secured to said front and second exterior wall sections, said conduit structure having a volume less than that of the interior of said rear portion of said hollow housing and forming therein a flow path which is isolated from said interior and through which discharged computer cooling air entering said inlet opening may be flowed to said outlet opening for outward discharge therethrough.

11. The docking base of claim 10 wherein:

said front exterior wall section has a connector opening disposed therein which receives said first electrical connector, and a portion of said connector opening defines said inlet opening.

12. The docking base of claim 10 wherein:

said second exterior wall section is a rear exterior wall section, and said outlet opening is downwardly offset from said inlet opening.

* * * * *

UNITED STATES PATENT AND TRADEMARK OFFICE
CERTIFICATE OF CORRECTION

PATENT NO. : 5,768,101
DATED : June 16, 1998
INVENTOR(S) : Chun-Che Cheng

It is certified that error appears in the above-indentified patent and that said Letters Patent is hereby corrected as shown below:

Column 4, line 21, "hollos" should be "hollow"
Column 4, line 49, "socking" should be "docking"

Signed and Sealed this

Twenty-second Day of September, 1998

Attest:

BRUCE LEHMAN

Attesting Officer

Commissioner of Patents and Trademarks